United States Patent
Lappe et al.

(10) Patent No.: US 9,048,463 B2
(45) Date of Patent: Jun. 2, 2015

(54) POUCH-CELL BATTERY ARRANGEMENT AND CORRESPONDING PRODUCTION METHOD AND USE

(75) Inventors: Dirk Lappe, Karlsruhe/Hohenwettersbach (DE); Ralf Bauer, Neckarsulm (DE); Hartmut Chodura, Stuttgart (DE); Guan Chew, Bietingheim-Bissingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 235 days.

(21) Appl. No.: 13/103,240

(22) Filed: May 9, 2011

(65) Prior Publication Data

US 2011/0287295 A1 Nov. 24, 2011

(30) Foreign Application Priority Data

May 21, 2010 (DE) .......... 10 2010 021 148

(51) Int. Cl.
| | | |
|---|---|---|
| *H01M 10/50* | (2006.01) | |
| *H01M 2/30* | (2006.01) | |
| *H01M 2/02* | (2006.01) | |
| *H01M 10/613* | (2014.01) | |
| *H01M 10/647* | (2014.01) | |
| *H01M 10/6554* | (2014.01) | |
| *H01M 10/6556* | (2014.01) | |
| *B60K 1/00* | (2006.01) | |

(52) U.S. Cl.
CPC ....... *H01M 2/0275* (2013.01); *B60K 2001/005* (2013.01); *H01M 2/021* (2013.01); *H01M 2/0212* (2013.01); *H01M 2/0217* (2013.01); *H01M 2/0267* (2013.01); *H01M 2/0287* (2013.01); *H01M 2/0292* (2013.01); *H01M 10/5004* (2013.01); *H01M 10/5032* (2013.01); *H01M 10/5053* (2013.01); *H01M 10/5057* (2013.01)

(58) Field of Classification Search
None
See application file for complete search history.

(56) References Cited

U.S. PATENT DOCUMENTS

| | | | | |
|---|---|---|---|---|
| 5,227,260 | A * | 7/1993 | Rose et al. | 429/54 |
| 6,296,967 | B1 * | 10/2001 | Jacobs et al. | 429/93 |
| 7,183,021 | B1 | 2/2007 | Akashi et al. | |
| 7,807,289 | B2 | 10/2010 | Seiler et al. | |
| 2005/0210662 | A1 | 9/2005 | Li | |
| 2008/0292950 | A1 * | 11/2008 | Maeda et al. | 429/120 |

FOREIGN PATENT DOCUMENTS

| | | |
|---|---|---|
| CN | 101312240 | 11/2008 |
| DE | 600 04 254 | 4/2004 |
| DE | 10252305 | 5/2004 |
| DE | 103089945 | 9/2004 |

(Continued)

OTHER PUBLICATIONS

AMAZON EU S.a.r.l., CMOS-Batterie CR2032 mi Stecker, Stand 24. Sep. 2009.

(Continued)

*Primary Examiner* — Ula C Ruddock
*Assistant Examiner* — Daniel Gatewood
(74) *Attorney, Agent, or Firm* — Gerald E. Hespos; Michael J. Porco; Matthew T. Hespos

(57) ABSTRACT

A pouch-cell battery arrangement has a shrink sleeve covering (50), that surrounds the pouch (22) at least in places in an interlocking manner.

11 Claims, 4 Drawing Sheets

A-A

(56) References Cited

FOREIGN PATENT DOCUMENTS

| DE | 10 2006 061 270 | 6/2008 |
| DE | 102009035484 | 2/2011 |
| JP | 2002100326 | 4/2002 |
| JP | 2008-181734 | 8/2008 |
| JP | 2008181734 A * | 8/2008 |
| JP | 2010061998 | 3/2010 |

OTHER PUBLICATIONS

CNC-MODELLSPORT GmbH, Saehan 4000, Stand 10. Jun. 2007.
LiPo-Hinweise Von TBO ("BOGOMIR67"), Was sie schon immer uber LiPos wissen wolten, und sich nie getraut haben, danach zu Googeln, Stand Dec. 8, 2006.

* cited by examiner

A-A

A-A

A-A

POUCH-CELL BATTERY ARRANGEMENT AND CORRESPONDING PRODUCTION METHOD AND USE

CROSS REFERENCE TO RELATED APPLICATION

This application claims priority under 35 USC 119 to German Patent Application No 10 2010 021 148.6 filed on May 21, 2010, the entire disclosure of which is incorporated herein by reference.

BACKGROUND OF THE INVENTION

1. Field of the Invention

The invention relates to a pouch-cell battery arrangement and to a corresponding production method, as well as use thereof.

2. Description of the Related Art

The invention and the problems on which it is based will be explained with reference to a lithium-ion pouch-cell battery arrangement even though other pouch-cell battery arrangements can be used.

Lithium-ion batteries must be sealed so that they are substantially impermeable to moisture and oxygen to avoid undesirable reactions with an electrolyte. The cells of a lithium-ion battery therefore normally are packed in a film pouch.

Pouch-cell batteries sealed in this way have numerous advantages, but are damaged more easily than cells that are enclosed in a rigid casing.

Furthermore, outer edge areas or edges of the pouch of a pouch cell battery often are not sufficiently electrically insulated. Furthermore, heat created during operation is more difficult to dissipate uniformly due to the uneven pouch surfaces.

DE 600 04 254 T2 discloses a pouch-cell battery arrangement where a rigid outer cover surrounds the pouch to provide additional insulation. This leads to a considerable increase in the volume of a pouch-cell battery arrangement, in comparison to the pouch-cell battery itself.

DE 10 2006 061 270 A1 discloses a battery pack having electrochemical cells in which a cell connector is provided at the end, for electrical connection of the cells.

US 2005/0210662 A1 discloses an arrangement of lithium cells in the form of a pouch, between which hollow metal plates or tubes are arranged for cooling.

U.S. Pat. No. 5,227,260 discloses an arrangement of battery cells in the form of a pouch, in a frame element.

The object of the present invention is to provide an improved pouch-cell battery arrangement and a corresponding production method, which arrangement has effective insulation, which can be produced easily.

SUMMARY OF THE INVENTION

The pouch-cell battery arrangement according to the invention advantageously has a covering that can be produced easily and at low cost and can be replaced easily if necessary.

The invention uses a heat-shrinkable material for the secondary sheathing.

The pouch may have a substantially rectangular shape.

Electrode connecting areas may be provided at the end on the pouch.

A side of the shrink sleeve that faces away from the pouch-cell battery preferably has a compensating compound at selected places to form a substantially planar surface area.

The shrink sleeve covering preferably has a thickness in the range 0.2 to 1 mm.

The shrink sleeve covering preferably surrounds the pouch at least in places in an interlocking manner and makes contact with a cold plate device.

Exemplary embodiments of the invention will be explained in more detail in the following description, and are illustrated in the drawings.

BRIEF DESCRIPTION OF THE DRAWINGS

FIG. 1a is a schmatic plan view of a battery in accordance with the invention at an initial manufacturing stage and FIG. 1b is a cross section taken along line A-A in FIG. 1a.

DETAILED DESCRIPTION OF THE PREFERRED EMBODIMENTS

The same reference symbols denote the same or functionary identical components in the figures.

Figure 1A:
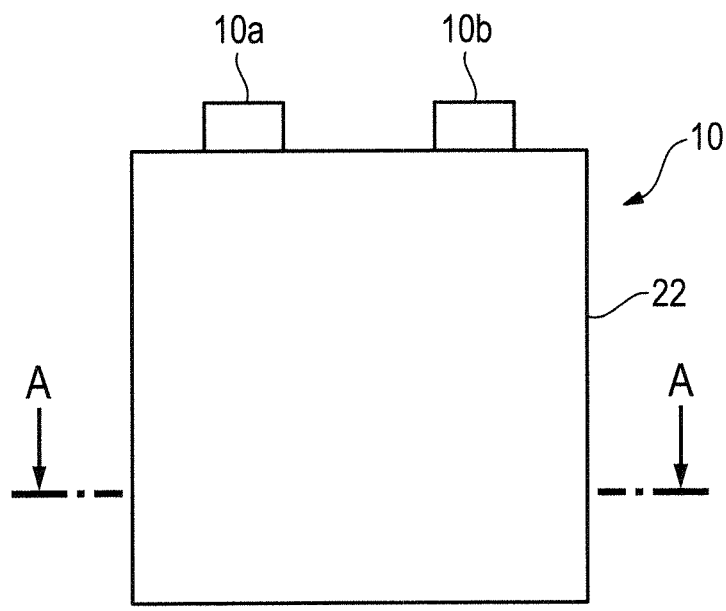
Figure 1B:
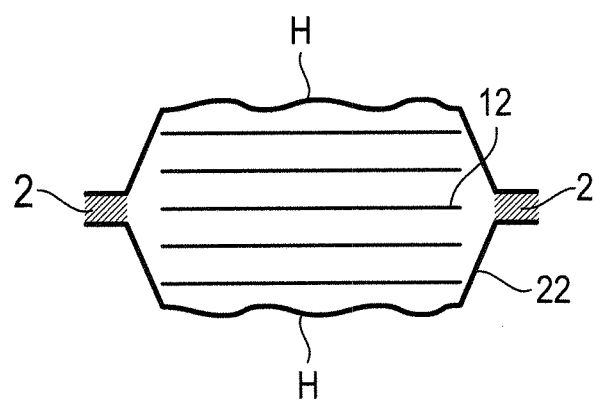

FIGS. 1a and 1b show a pouch-cell battery 10 that has a substantially rectangular pouch 22 composed of a flexible plastic film material with electrode connecting areas 10a, 10b provided on an end face.

The pouch 22 is joined together on its side edges by adhesive bonds or weld beads 2, as shown in FIG. 1b. Opposite main surfaces H of the pouch 22 have a corrugated irregular shape. An electrode arrangement 12 is provided in the pouch 22 and is surrounded by an electrolyte.

Figure 2A:
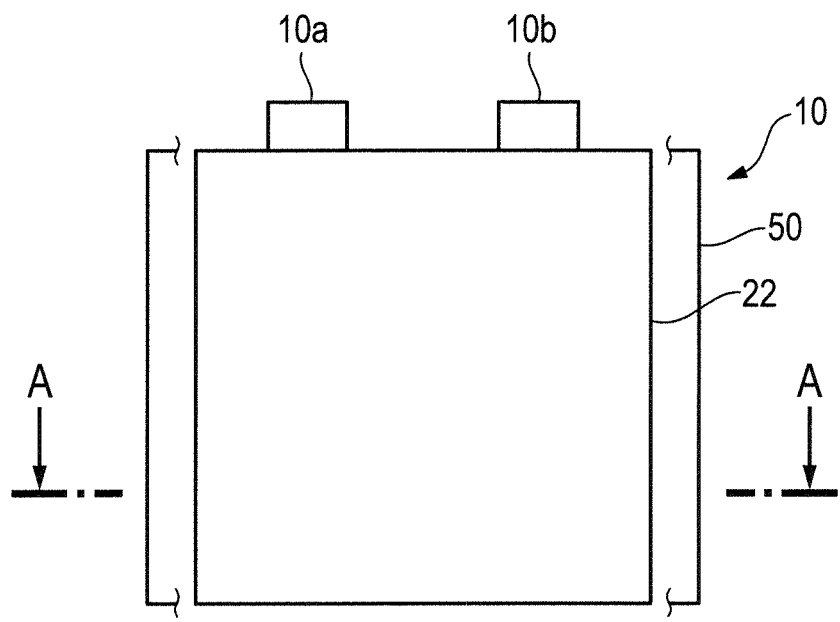
FIG. 2a is a schmatic plan view of the battery of FIG. 1a at a second manufacturing stage and FIG. 2b is a cross section taken along line A-A in FIG. 2a FIG. 3a is a schmatic plan view of the battery of FIG. 2a at a third manufacturing stage and FIG. 3b is a cross section taken along line A-A in FIG. 3a FIG. 4 is a cross sectional view similar to FIG. 3b, but showing the battery at a further stage of manufacturing.
Figure 2B:
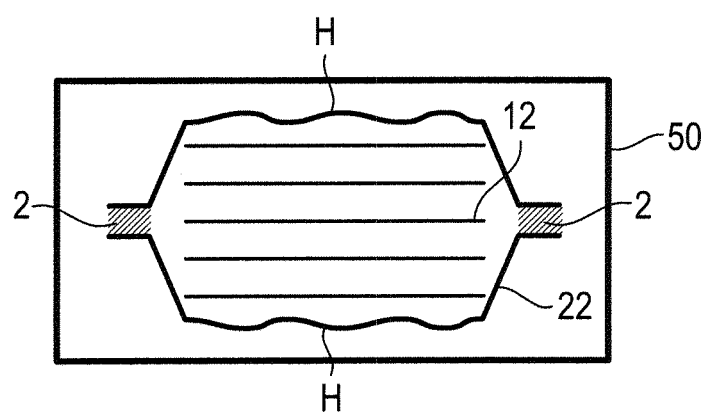

As illustrated in FIGS. 2a and 2b, a shrink sleeve 50 composed of a non-conductive, heat-shrinkable material with a relatively high rubber content is placed around the main surfaces H and the side surfaces the are adhesively bonded or welded and are located in-between. However, the rear face and the opposite end face, together with the electrode connecting areas 10a, 10b are left free.

Figure 3A:
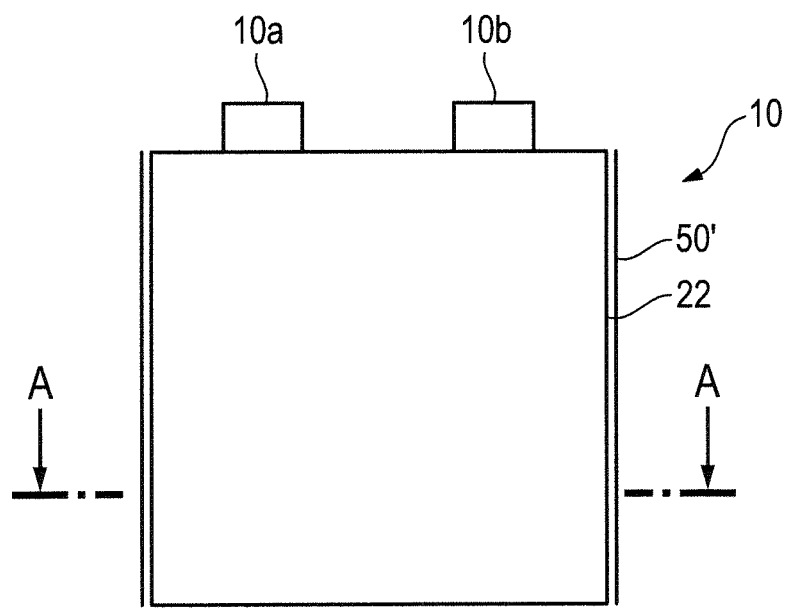
Figure 3B:
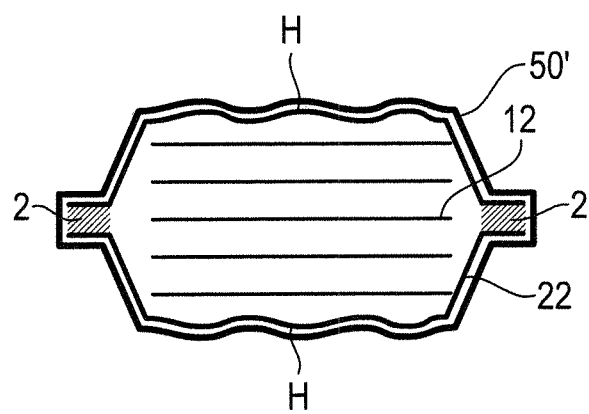

FIGS. 3a and 3b illustrate a subsequent process step where the shrink sleeve 50 is heat-treated and shrinks sufficiently to match in a substantially interlocking manner to the main surfaces H and the side surfaces located between the main surfaces H. Thus, the pouch-cell battery 10 is covered by the shrunk shrink sleeve 50', which surrounds the pouch 22 in an interlocking manner. In this case, the shrink sleeve 50' has a typical material thickness of 0.2 mm to 1 mm.

The above-described covering with the shrunk shrink sleeve 50' insulates the side edges to prevent undesirable cell discharges, protects the sharp side edges against chafing, and smoothes the corrugation of the main surfaces H. Furthermore, the covering offers the capability for an improved thermal connection to a cooling device and provides the pouch-cell battery arrangement with better mechanical resistance overall. The covering described herein can be produced easily and at low cost compared to known solutions with secondary sheathing. Furthermore, the covering is easily replaceable, if required.

Figure 4:
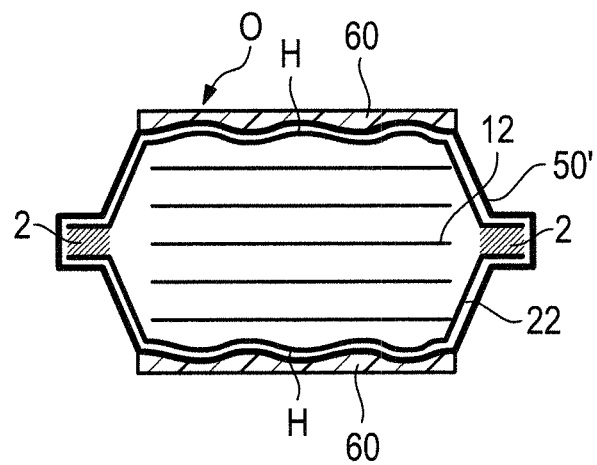

FIG. 4 shows a cross section along the line A-A to explain a second embodiment of the pouch cell battery arrangement according to the invention, and its production.

In the embodiment shown in FIG. 4, the process state that is shown in FIGS. 3a, b is followed by the application of a compensating compound 60 at least in places on the covering comprising the shrink sleeve 50' on the main surfaces H. The compensating compound 60 typically is based on silicone. Thus, the shrink sleeve 50' and the compensating compound 60 define a sheathing with a substantially planar surface O over the main surfaces H. This configuration allows even more efficient thermal connection and regular contouring, thereby simplifying stacking and dense packing.

Figure 5:
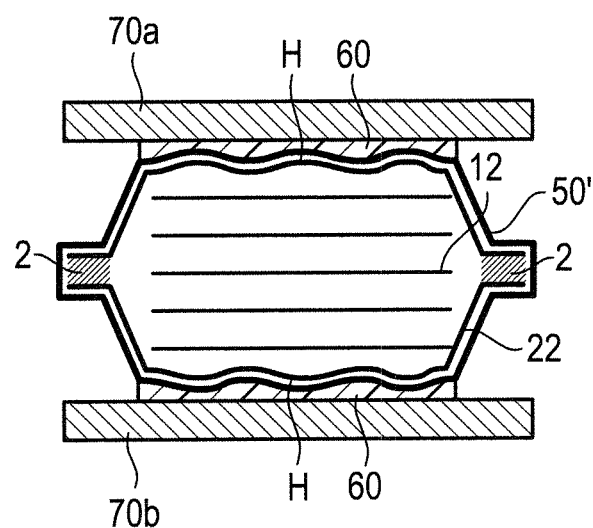
FIG. 5 is a cross sectional view similar to FIG. 4, but showing the battery at a further stage of manufacturing.

FIG. 5 is a cross section along the line A-A to explain a third embodiment of the pouch-cell battery arrangement according to the invention, and its production.

The third embodiment, as shown in FIG. 5, has the pouch-cell battery arrangement of FIG. 4 surrounded on both sides by a cold-plate device having two cold plates 70a, 70b to transport away heat that originates from the main surfaces H. For example, cooling tubes may pass through the cold plates 70a, 70b, and a transport medium, such as water, may be passed through the cooling tubes.

The invention has been explained above with reference to preferred embodiments, but is not restricted thereto and can be implemented in other ways.

Although the invention has been explained with reference to lithium-ion batteries, it is not restricted thereto and can be used for any desired pouch-cell batteries.

The pouch, shrink sleeve and compensating compound are only examples, and can be replaced or supplemented by other materials with appropriate characteristics.

The embedding of the pouch-cell battery arrangement between the cold plates 70a, 70b is not restricted to the embodiment shown in FIG. 4 but, with appropriate surface corrugation, can also be used for the arrangement shown in FIG. 3b.

One preferred application for the pouch-cell battery arrangement according to the invention is in the motor-vehicle field, where the covering comprising the shrink sleeve should be chosen to have a temperature resistance between −55° and 150° C. However, this application is not restrictive, and many other applications are feasible, for example in the domestic field, in the telecommunications field, and in the power installation field.

What is claimed is:

1. A pouch-cell battery arrangement having:
    a pouch-cell battery with an electrode arrangement packed in a pouch, the pouch having opposite main surfaces, opposite sides extending between the main surfaces and opposite ends extending between the main surfaces and the sides, the main surfaces having a corrugated non-planar shape;
    a covering comprising a shrink sleeve surrounding at least the sides and the main surfaces of the pouch and conforming to the corrugated non-planar shape of the main surfaces and to shapes of the sides in an interlocking manner;
    a compensating compound applied to parts of the shrink sleeve covering the main surfaces of the pouch, the compensating compound having an inner surface in contact with the shrink sleeve and conforming to the non-planar shape of the main surface and an outer surface facing away from the shrink sleeve and having a substantially planar surface area; and
    at least one cold plate in face-to-face contact with the substantially planar outer surface area of the compensating compound.

2. The pouch-cell battery arrangement of claim 1, wherein the pouch is substantially rectangular.

3. The pouch-cell battery arrangement of claim 1, wherein electrode connecting areas are at an end of the pouch.

4. The pouch-cell battery arrangement of claim 1, wherein the covering comprising the shrink sleeve has a thickness in a range of 0.2 to 1 mm.

5. A method for producing a pouch-cell battery arrangement, comprising:
    providing a pouch cell battery having a pouch with opposite main surfaces, opposite sides extending between the main surfaces, and opposite ends extending between the main surfaces and the sides, the main surfaces having a corrugated non-planar shape;
    covering the sides and the main surfaces of the pouch of the pouch-cell battery with a shrink sleeve; and
    thermally shrinking the sleeve to form a covering comprising the shrink sleeve that surrounds at least the main surfaces and the sides of the pouch and conforms at least to the corrugated non-planar shape of the main surface in an interlocking manner
    applying a compensating compound over at least corrugated non-planar regions on a side of the shrink sleeve that faces away from the main surfaces of the pouch-cell battery so that the compensating compound has an inner surface that conforms to the corrugated non-planar shapes of the main surfaces and an outer surface that faces away from the shrink sleeve and defines a substantially planar surface area.

6. The method of claim 5, wherein the compensating compound comprises silicone.

7. The method of claim 5, wherein the covering comprising the shrink sleeve has a temperature resistance in a range between −55 and 150° C.

8. The method of claim 5, wherein the covering comprising the shrink sleeve has a thickness in a range of 0.2 to 1 mm.

9. The pouch-cell battery arrangement of claim 1, wherein said shrink sleeve comprises a heat-shrinkable material having a rubber content.

10. The pouch-cell battery arrangement of claim 1, wherein said compensating compound comprises a silicone material.

11. The pouch-cell battery arrangement of claim 1, wherein the compensating compound is applied to each of the opposite main surfaces, so that the compensating compound defines first and second substantially planar outer surface areas that face away from the shrink sleeve, and wherein the at least one cold plate device comprises first and second cold plate devices that are in contact respectively with the first and second substantially planar outer surface areas defined by the compensating compound.

* * * * *